(12) United States Patent
Zeng

(10) Patent No.: US 6,802,798 B1
(45) Date of Patent: Oct. 12, 2004

(54) ADJUSTABLE GEMINI PEDAL TRACE EXTENDING CRANK MECHANISM

(76) Inventor: Steve Sijet Zeng, No. 212, Shin-I St., Nan-Tou City, Nan-Tou Hsien (TW)

( * ) Notice: Subject to any disclaimer, the term of this patent is extended or adjusted under 35 U.S.C. 154(b) by 0 days.

(21) Appl. No.: 10/465,574

(22) Filed: Jun. 20, 2003

(51) Int. Cl.$^7$ .......................... A63B 21/00; F16H 21/42
(52) U.S. Cl. .................. 482/57; 482/63; 74/63
(58) Field of Search .................. 482/57–65, 51–53, 482/908; 74/594.1

(56) References Cited

U.S. PATENT DOCUMENTS

| | | | |
|---|---|---|---|
| 3,865,366 A | * | 2/1975 | Stantial .................. 482/57 |
| 4,800,768 A | * | 1/1989 | Kazuta .................. 74/63 |
| 5,261,294 A | * | 11/1993 | Ticer et al. ............... 74/594.1 |

* cited by examiner

Primary Examiner—Stephen R. Crow
(74) Attorney, Agent, or Firm—Browdy and Neimark, P.L.L.C.

(57) ABSTRACT

An adjustable crank mechanism comprises a sun gear rigidly attached to a main frame of the device and the sun gear meshed with an adjacent planetary gear of half diameter. A planetary crank arm rigidly projecting from the planetary gear generates an alternative movement of a corresponding linkage arm. A drive member constituted by a planetary crank arm jointed with a planet gear and a linkage arm jointed to the sliding pedal crank on a crank assembly makes the pedal crank extend to the maximum and return to the minimum rotating distance at each halves of cycle. Thus, the pedal on this pedal crank mechanism will move on a Gemini pedal trace to simulate the foot trace of human running or walking.

5 Claims, 6 Drawing Sheets

ADJUSTABLE GEMINI PEDAL TRACE EXTENDING CRANK MECHANISM

BACKGROUND OF THE INVENTION

1. Field of the Invention

The present invention relates to cycle pedal crank extensions, and more particularly, to an apparatus which synchronically extends the pedal crank twice at one cycle and provides an adjustable mechanism for variable Gemini trace on different usage.

2. Description of the Related Art

Cycling exercise has very long history on human activity. Some variable speed gears and sprocket systems are popular with the cyclists to adjust the work out for different road condition. They change the ratio between the front and the rear gear or sprocket through chain or belt to get higher efficiency, or change a different number of revolutions made respectively by the crank to communicate a difference of velocity. Furthermore, some extending pedal mechanisms are provided to lowdown the exertion at the front downward stroke. The cyclists get the minimum of exertion if the pedal arm could extend longer. If the power source works best over a relatively restricted range of output transmission, the crank system can be extremely beneficial.

Generally, the distance of pedal crank has some limitations to fit the requirements of practical usage. Pedal crank of long rotating distance can produce bigger torque and save power, but long crank arm leads to increase the size of entire crank device as well as its working space. The crank will be perfect if the rotating distance of the pedal crank could increase at horizontal position and decrease at vertical position for leg movement so as to provide more exertion at pedaling path.

Stationary cycling exercise is wildly used for cardiovascular exercise. While the range of motion provided by a cycling exercise is fairly limited, these exercising motions are not always optimal and can induce excessive joint or muscle stress. In these years, many elliptical cycles or trainers are wildly introduced. Some inventions emphasized the elliptical emotion are more similar to human walking. Most of these exercise devices utilize two or three exercising motions, like circular (single crank path), arcuate (lever path), or linear (slider or roll path). These three motions rarely duplicate functional and real world motions in an accurate manner to dissatisfy the user. In addition, the machines are complicated and huge for operation because of the complicated mechanism. An improved mechanical system, which can be used in various types of exercising machines and generate a controlled closed exercise motion more closely to simulating functional and real world activities, is required. It is also desirable that exercise device is relatively easy to use and to be low-cost in production.

Pedaling systems for transferring leg drive power of a cyclist to exercise devices are popular. The normal sprocket gear of circular device is coupled by a chain to a driver sprocket gear to rotate the rear wheel or a flywheel. Pedal cranks are located on each side of the drive sprocket gear, oriented 180 apart from one another. Each pedal in turn affords half input at one cycle to drive the wheel to rotate. The cyclist of the device rotates the drive sprocket by means of a circular cycling motion. Furthermore, the pedal crank mechanisms are improved to get more torque at front stroke for improving the efficiency. Many similar mechanisms use guiding cam, disc, or pulley to control variation of the pedal crank, and for example, U.S. Pat. No. 6,152,471 in the name of Kang et al. disclosed that some eccentric pans proceed variable pedal path. Meanwhile, there are some planetary gears or sprockets to accomplish the extension or orientation of the pedal crank. The mechanism is provided to improve efficiency of cycling and is therefore emphasized on the front stroke.

U.S. Pat. No. 5,433,680 disclosed an elliptical path pedaling system which has two circular driven members reciprocating in horizontal route, and it must be coupled with one or more chain linkages to perform the synchronic coordination of the cycle transmission.

In other case, many elliptical cycles and trainers are promoted for sale in market. These exercise machines, which utilize combined exercising motions, circular, arcuate, or linear, have been developed to simulate the motions of human skiing, walking, or running. The driving motion is the same. The pedal cranks rotate about a fixed axis or a center line around which either a sprocket wheel or the drive lever offsets are rotated to produce the driving power for moving the device to rotate. In addition, the elliptical pedal path is between an end of circular movement and the other end of reciprocating movement. U.S. Pat. No. 6,027,431 disclosed a linkage assembly, which has rotation of an adjustable crank length at an end and suspended reciprocation at the other end of the device to generate adjustable elliptical movement. It is similar that most of the elliptical devices take more space than normal cycle exercise devices, and some linkages are hard to cover because of complicated mechanism, especially for the elongated pedal. It is major concern for the exercise devices on safety and convenience to provide suitable mechanism.

SUMMARY OF THE INVENTION

An improved mechanical system, which can be used in various types of exercising devices, generates a controlled closed exercise motion more closely to simulate functional and real world activities, which provide the physical benefits of cycling without impact. It is, therefore, an object of this invention to provide an improved pedaling crank system which produces Gemini pedal trace similarly as an ellipse path from a cycling motion coupled with reciprocating inner crank motion.

It is a further object to provide an effective pedaling crank system for delivering a greater power for a long period of time during pedal operation cycle, which overcomes the disadvantages of the prior art noted above to be effective in operation, easy to use, and capable adaptation into a variety of different devices.

It is an additional object of this invention to provide an adjustable pedal trace mechanism more flexible for practical use on the exercise devices or the like.

BRIEF DESCRIPTION OF THE DRAWINGS

FIG. 3a shows the pedal crank at full extension. FIG. 3b shows that the pedal crank rotates at an angle of 45 from the position shown in FIG. 3a to another shown in FIG. 3c and FIG. 3d at each angle of each 45.

DETAILED DESCRIPTION OF THE INVENTION

Figure 1:
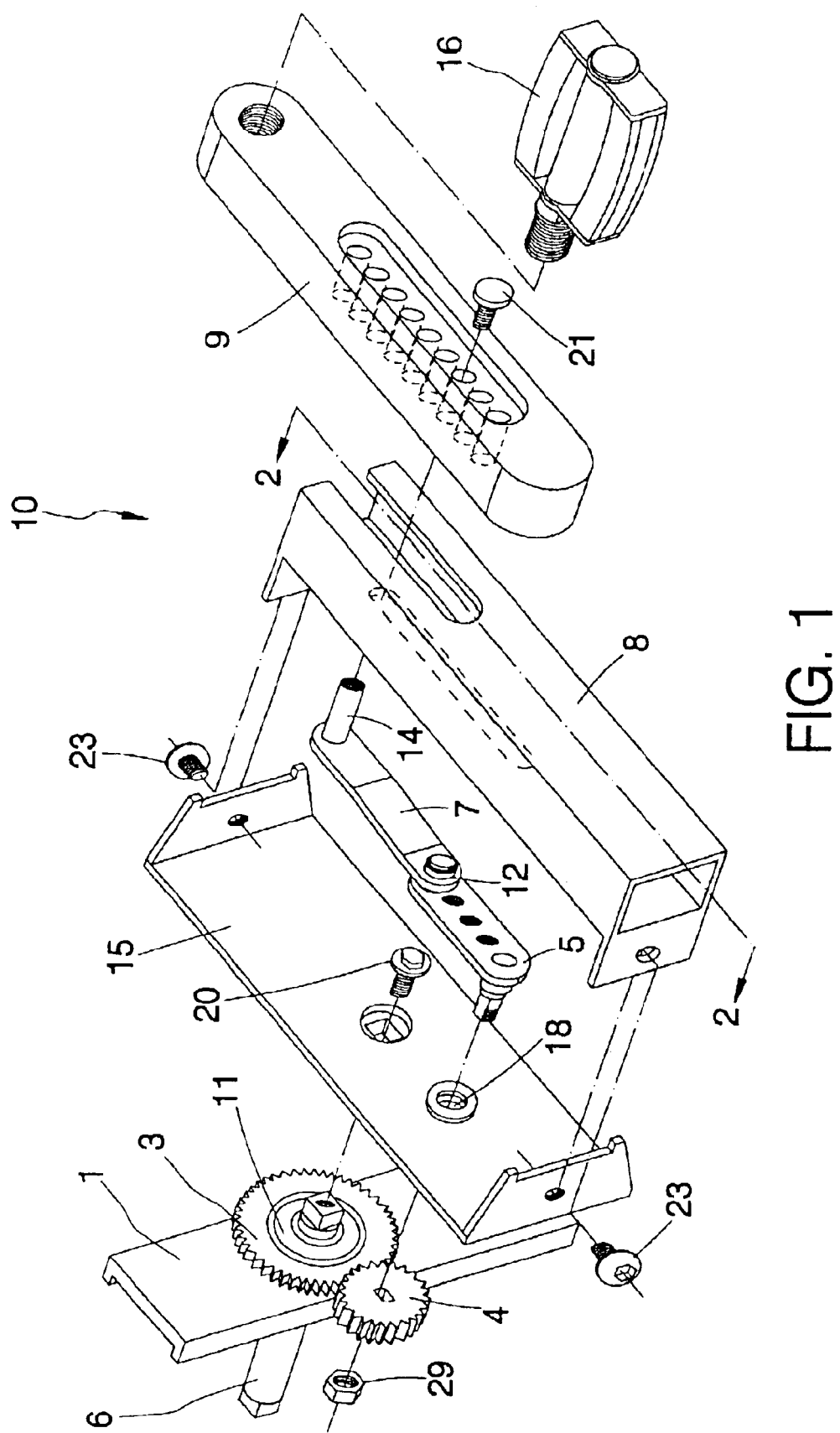
FIG. 1 is a prospective view of a side of a pedal extension apparatus and a synchronizing mechanism of the present invention.
Figure 2:
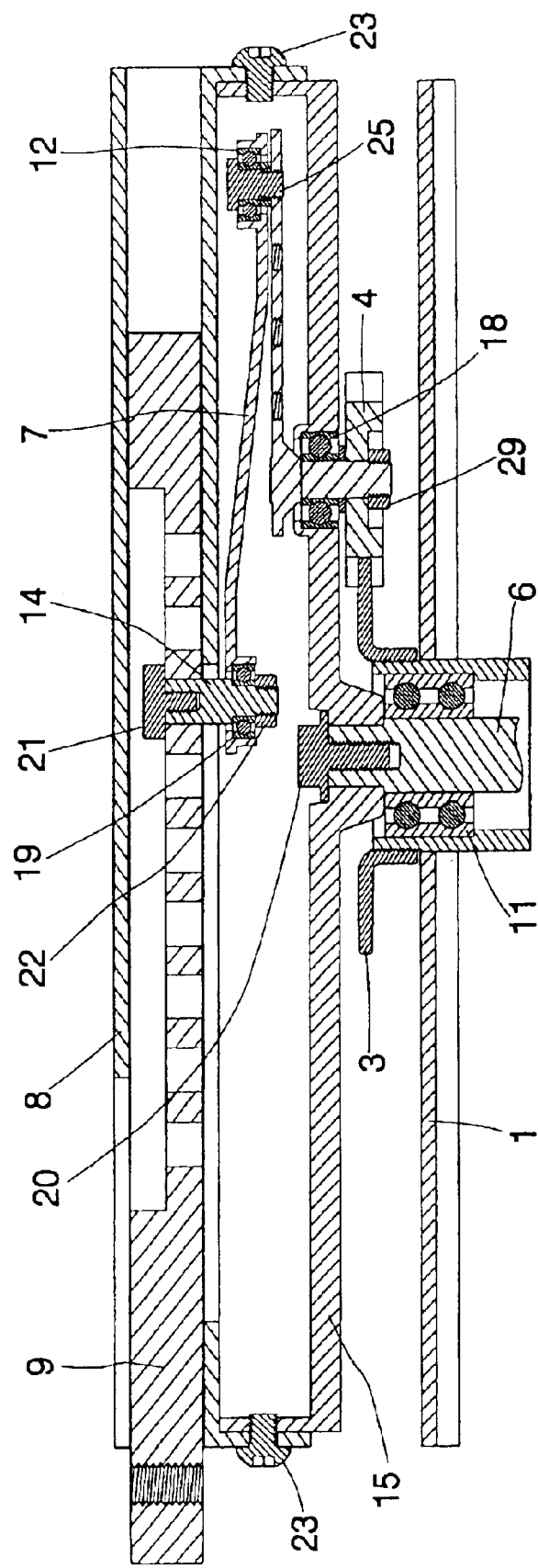
FIG. 2 is a sectional view of the pedal extension device according to the present invention taken along a line 2—2 through a central axis shown in FIG. 1.

A pedal system is constituted of two same mechanisms of the present invention shown in FIGS. 1 and 2 showing a crank mechanism 10 which is mounted on a main shaft 6 to a main frame 1 with a shaft bearing 11. The two same mechanisms are located at each side of exercise device and arranged at the angle of 180° reversed. Therefore, the two pedals are positioned at the angle of 180° with respect to each other on the rigid main shaft 6 which is supported with the shaft bearing 11 to the main frame 1 of device, such that pushing down on one of the pedals provides a corresponding lifting or raising of the other pedal.

A sun gear 3 is a fixed transmission member non-rotatably fixed to the main frame 1. The sun gear 3 has an adjacent planetary gear 4 which transmits the rotation to a connected planetary crank arm 5. The diameter of the planetary gear 4 is half of the diameter of the sun gear 3. The planetary gear 4 turns twice as it turns around the fixed sun gear 3 once. The planetary gear 4 and the planetary crank arm 5 are mounted with a pivot bearing connection 12 at a crank retainer holder 15, which is fixed to the main shaft 6 with a shaft screw 20. The crank retainer holder 15 carries a set of a pedal crank retainer 8 and a sliding pedal crank 9 jointed with a extender linkage arm 7 to the planetary crank arm 5. The one end of linkage arm 7 is fixed with a position axle 14 and position axle screw 21 through a slot of the pedal crank retainer 8 on the sliding pedal crank 9 at one position hole of the pedal crank, and the other end is fixed with a pivot bearing connection 12 on the planetary crank arm 5. The sliding pedal crank 9 is inserted into the pedal crank retainer 8 and the whole set is mounted to the crank retainer holder 15 with holder screws 23.

Figure 3A:
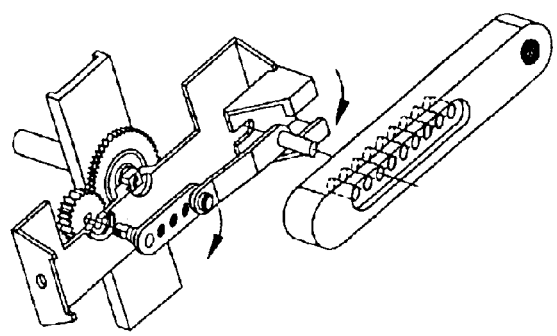
FIGS. 3a–3d show the different variations of the pedal crank.
Figure 3B:
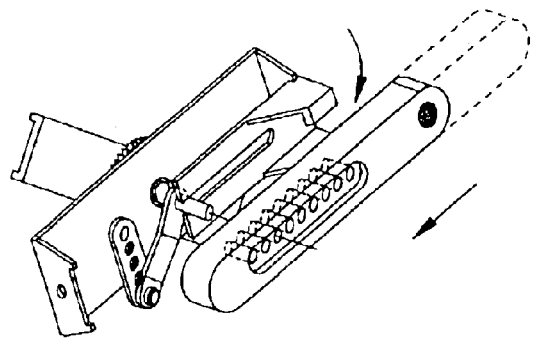
Figure 3C:
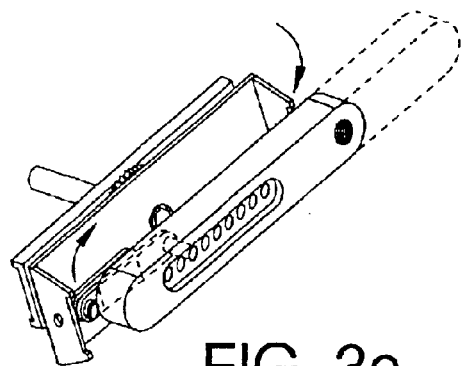
Figure 3D:
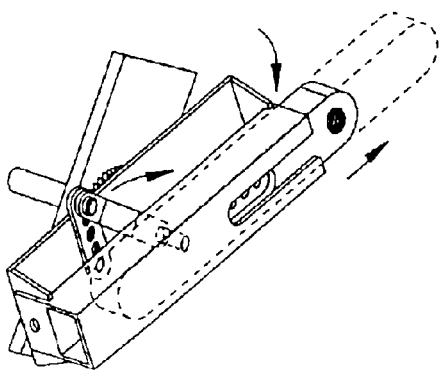

When a cyclist pedals the crank mechanism 10 for cycling exercise, the planetary gear 4 will rotate and drive the planetary crank arm 5 to position the extender linkage arm 7 which pushes or pulls the sliding pedal crank 9 to extend to maximum rotating distance or return to the minimum rotating distance. FIGS. 3a–3d show the different variations of the pedal crank. FIG. 3a shows the sliding pedal crank 9 at full extension and is like the pedal position of the front stroke of the cycling exercise. The right pedal 16 rotates clockwise while the cyclist pedals this pedal crank mechanism 10 and the planetary gear 4 clockwise rotates at outside view. When the right pedal 16 circulates quarter cycle, the planetary gear 4 circulates half cycle because of the half diameter of the planetary gear 4 compared to the sun gear 3 fixed on the main frame 1. FIG. 3b shows that the pedal crank mechanism 10 rotates at the angle of 45° and the planetary gear 4 rotates quarter cycle from the position in FIG. 3a. Continuously, the pedal crank mechanism 10 rotates at the angle of more than 45°, and planetary gear 4 rotates another quarter cycle, as show on FIG. 3c. In FIG. 3a–3c, the pedal crank mechanism 10 rotates quarter cycle and the planetary gear 4 rotates half cycle. It is like the movement of the right pedal 16 started at the front position and moved to the bottom position on cycling exercise. From FIG. 3 to FIG. 3d and back to FIG. 3a, it shows another half cycle of the pedal crank mechanism 10. It is also like the movement of the pedal 16 started from the bottom and moved to the rear position on cycling exercise. The same procedure can be obtained while the right pedal 16 moves from rear to top then to front position. The pedal crank mechanism 10 rotates once and the planetary gear 4 synchronously rotates twice. The force is transmitted from the planetary gear 4 to the planetary crank arm 5 to push or pull the extender linkage arm 7 for a reciprocating movement and driving the pedal crank 9 to slide on the crank retainer 8. Thus the reciprocating movement of the extender linkage arm 7 driven by the planetary crank arm 5 with planetary gear 4 makes the sliding pedal crank 9 extending and returning twice in one cycle of the rotation of the right pedal 16.

Figure 4:
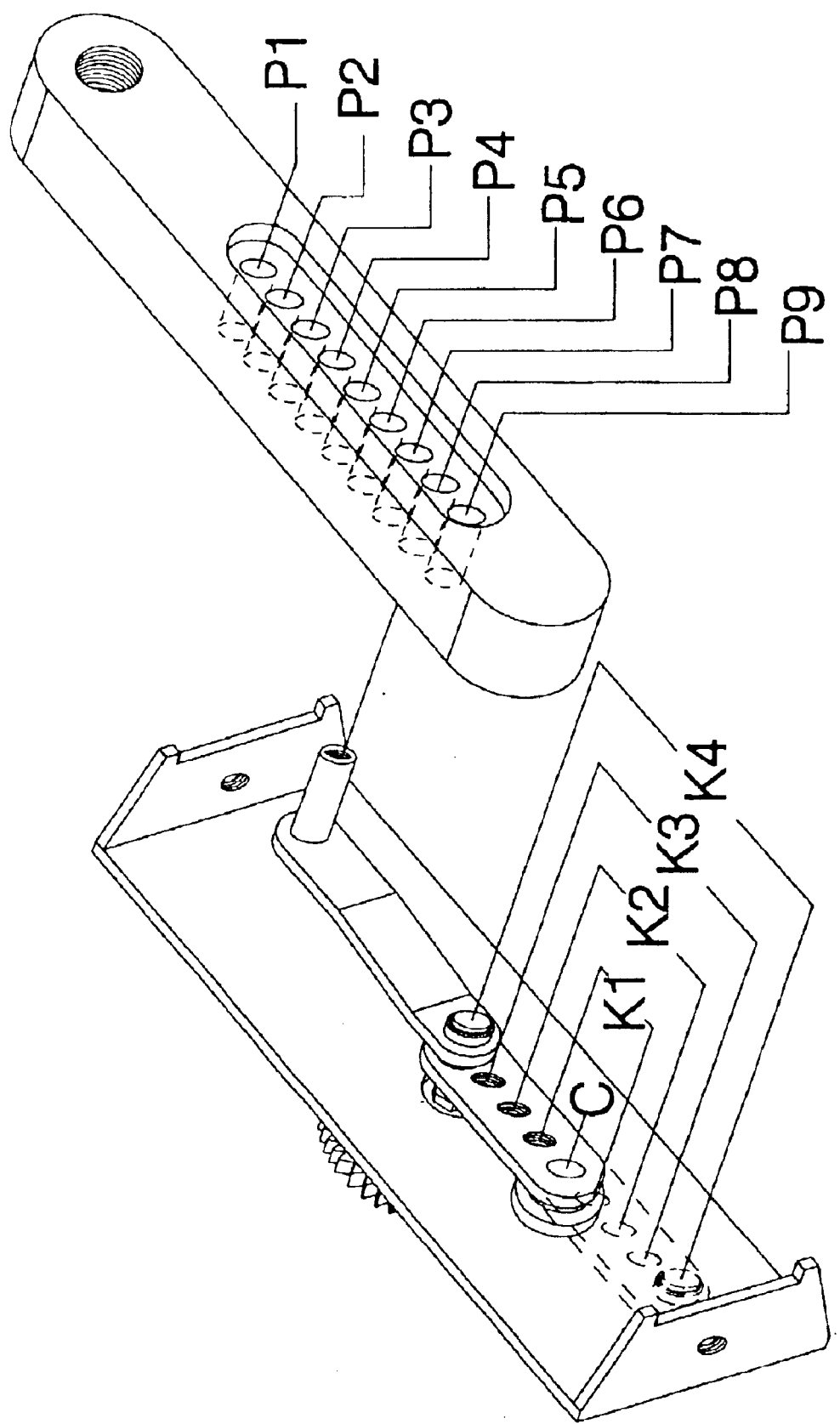
FIG. 4 illustrates the adjustment of the adjustable pedal crank mechanism with different choices including four position choices at planetary crank arm to decide the reciprocating distance and several position choices at the sliding pedal crank to define the rotating distance of pedal.
Figure 5:
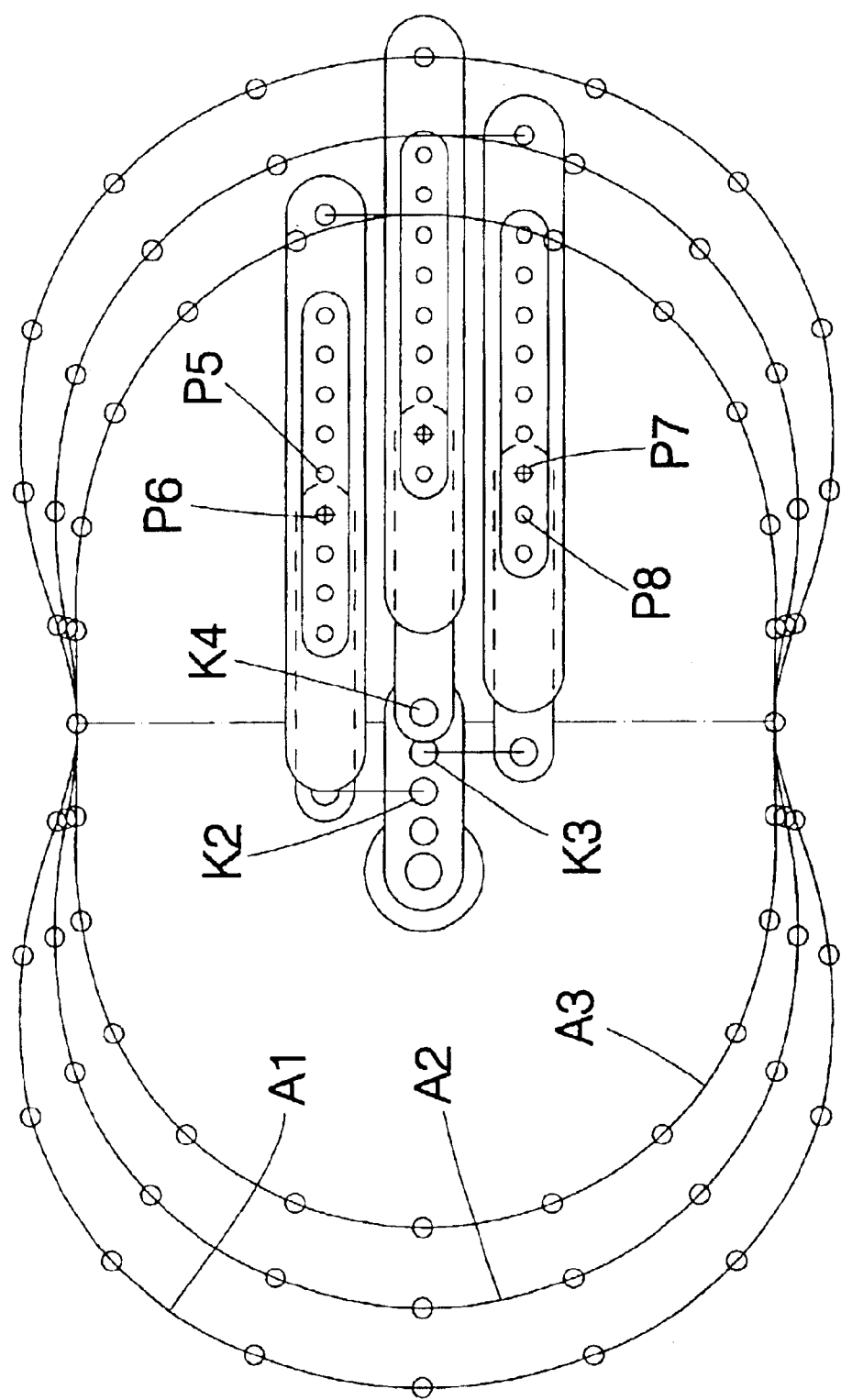
FIG. 5 illustrates different Gemini traces of the pedal axis by adjusting, which only changes the extending distance on the position of planetary gear crank, but the minimum rotating distance is remained as the same as original start position of the pedal.
Figure 6:
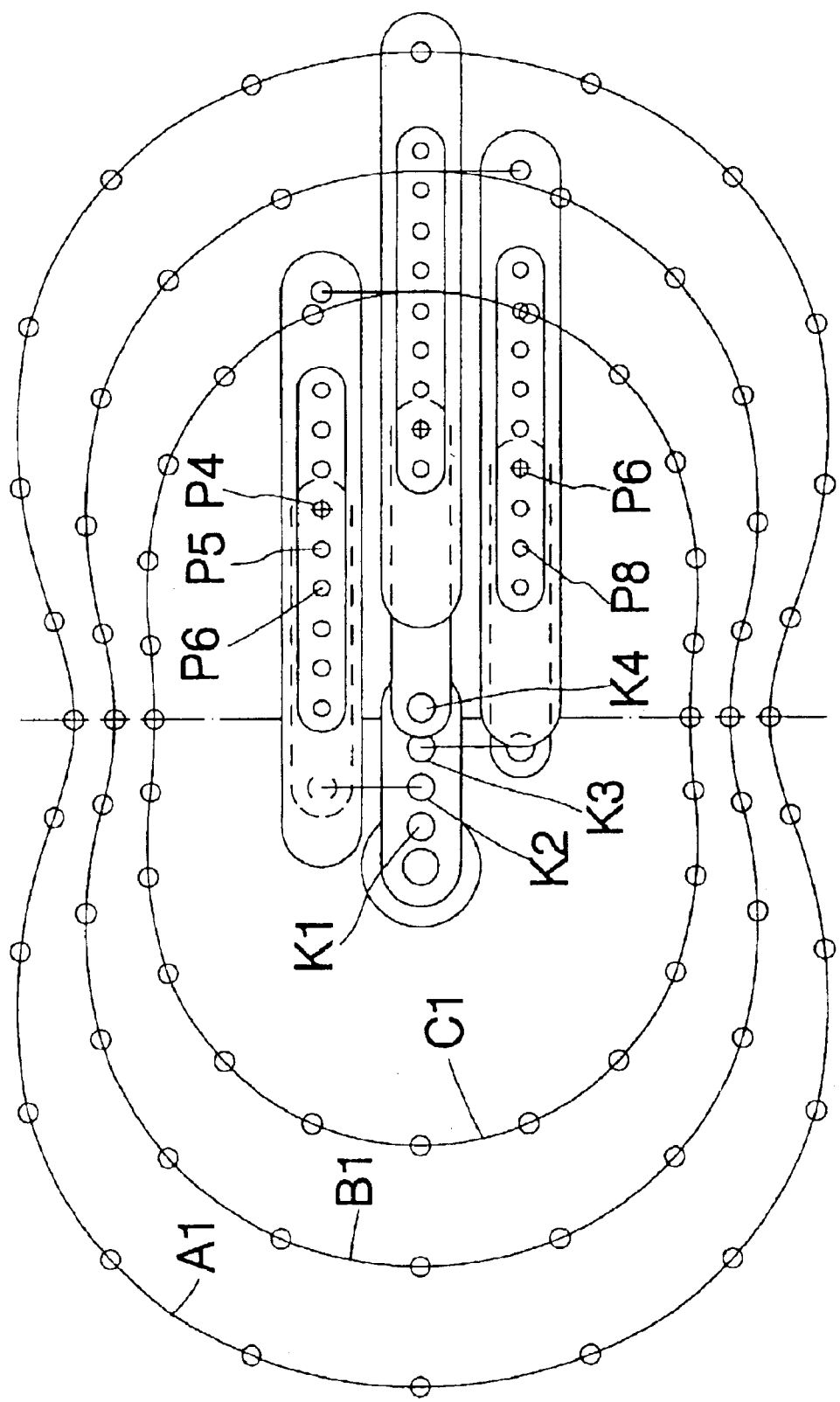
FIG. 6 is illustrates different Gemini traces of the pedal axis if the minimum rotating distance of pedal is changed as well as extending distance to get some similar traces.

An oval pedal trace can be obtained from the movement of the pedal 16 on the rotation of the pedal crank mechanism 10. While with the different reciprocating distance and different rotating distance of the right pedal 16 to the rotating center of the main shaft 6, the oval pedal trace will be different. FIG. 4 illustrates the adjustment of the adjustable pedal crank mechanism 10. When the pivot bearing connection 12 fixes the extender linkage arm 7 at position K4 of the planetary crank arm 5, the reciprocating distance is the maximum and the extension of the sliding pedal crank is the maximum. If the pivot bearing connection 12 changes to position K3 of the planetary crank arm 5 and the position of the position axle 14 to the sliding pedal crank 9 remains the same, the reciprocating distance of the extender linkage arm 7 will decrease a little and the minimum rotating distance of the pedal 16 to the rotating center of the main shaft 6 will increase a little. At this time, moving the position axle 14 from original P8 to an outer position P7 hole of the sliding pedal crank 9 can obtain the same minimum rotating distance of the pedal 16 as the original. In this way, decrease the reciprocating distance a little and maintain the same minimum rotating distance of right pedal 16 to the rotating center of main shaft 3, the pedal 16 will have a variable oval pedal trace as A2 trace in FIG. 5. Then, if more the reciprocating distance of extender linkage arm 7 is decreased and the minimum pedal rotating distance is maintained, another small curve as A3 trace in FIG. 5 can be obtained. Comparatively, if the reciprocating distance as well as the minimum pedal rotating distance is decreased a little, the pedal 16 will have a similar and small oval pedal trace as B1 trace in FIG. 6. For example in FIG. 6, A1 trace represents K4 position of the pivot bearing connection 12 and P8 position of the position axle 14. B1 trace represents K3 position of the pivot bearing connection 12 and P6 position of the position axle 14. C1 trace represents K2 position of the pivot bearing connection 12 and P4 position of the position axle 14. From the relationship of different positions of the pivot bearing connection 12 as well as different positions of the position axle 14, the right pedal 16 has many different variable oval pedal traces.

In the aforementioned mechanism, the pedaling system of an exercise device has two same adjustable pedal crank mechanisms like the present invention. Only the threaded holes at the pedal crank for installing the pedals are different for the right or left pedal. These two adjustable pedal crank mechanisms with the same adjustment are operated similarly but reversely at an angle of 180° in orientation and arrangement. It is similar to the pedal system of the cycling device.

The foregoing description of the preferred embodiment of the invention should be considered as illustration but not limitation. Various changes and modifications will occur to those skilled in the art for performing substantially the same function, in substantially the same way, to achieve substantially the same result, without departing from the true scope of the invention as defined in the appended claims.

What is claimed is:

1. An adjustable oval pedal trace extending crank mechanism comprising:

a power transmitting shaft having two ends;

a crank assembly fixed at an end of said shaft;

a sun gear rigidly attached to a frame adjacent to said shaft;

a planetary gear having half of the diameter of said sun gear; said planetary gear being rotatably attached to said crank assembly and meshed with said adjacent sun gear, said planetary gear having one end of a radially projecting arm connected thereto, said projecting arm having an extending arm rotatably fixed at the other end of said projecting arm;

a slidable pedal crank retained on said crank assembly;

the extending arm rotatably fixed on the slidable pedal crank of said crank assembly, the extending arm being driven to move back and forth by said projecting arm when said planetary gear rotates along with said sun gear; and the slidable pedal crank having the extending arm rotatably fixed to a position hole on the slidable pedal crank, said slidable pedal crank moving back and forth synchronically with the rotation of said crank assembly; said slidable pedal crank having a threaded hole at the end thereof to install a pedal thereon;

wherein forces applied onto said pedal drive said rotatable crank assembly to rotate, said rotatable crank assembly drives said shaft and said planetary gear to rotate around said sun gear, and said projecting arm on said planetary gear is arranged, such that said pedal crank slides back and forth from said shaft at a position in one of the halves of the cycle.

2. The mechanism as defined in claim 1, wherein said pedal trace has an oval pedal trace.

3. The mechanism as defined in claim 2, wherein said projecting arm or said pedal crank have position holes which provide variable oval pedal traces.

4. The mechanism as defined in claim 3 engaged to a power drive means.

5. The mechanism as defined in claim 4, wherein said frame means constitutes a portion of a frame for exercise devices.

* * * * *